United States Patent

[11] 3,584,732

| [72] | Inventors | Loren E. Tyler<br>Wayzata;<br>James L. Richardson, Excelsior, both of, Minn. |
|---|---|---|
| [21] | Appl. No. | 796,979 |
| [22] | Filed | Feb. 6, 1969 |
| [45] | Patented | June 15, 1971 |
| [73] | Assignee | Letco, Inc.<br>Long Lake, Minn. |

[54] OVER-CENTER WINCH APPARATUS
14 Claims, 8 Drawing Figs.

[52] U.S. Cl. .................................................. 198/115,
198/213
[51] Int. Cl. .................................................. B65g 21/12,
B65g 33/14
[50] Field of Search ........................................ 198/87, 94,
99, 113—114, 121—122, 213; 74/89.2, 89.4,
89.22; 212/8, 46

[56] References Cited
UNITED STATES PATENTS

| 2,733,817 | 2/1956 | Couse ........................... | 212/8 |
| 2,772,767 | 12/1956 | Seifert ......................... | 198/115 |
| 2,859,629 | 11/1958 | Parker .......................... | 74/89.22 |

*Primary Examiner*—Edward A. Sroka
*Attorneys*—Donald R. Sjostrom and Robert P. White ABSTRACT: A trailer-type spreader-hauler for fertilizer, feed, or other particular material and including a hopper or tank for containing the material and an auger conveyor mounted adjacent the front end of the unit. The conveyor includes a lower portion fixed with respect to the hopper and inclined at an acute angle to the horizontal and a movable portion which, in one position is in continuous alignment with the lower portion but is pivotable through a vertical or overcenter position to a retracted or rest position wherein it extends back across the front of the hopper and forms an acute angle with the lower portion. A cable has one end connected to the movable portion of the auger and the other end connected to a winch whereby it may be retracted or extended. Intermediate these two ends, the cable extends over a pulley apparatus which is disposed above and in vertical alignment with the pivot. The cable and pulley apparatus cooperate so that retraction of the cable when the movable portion of the conveyor is disposed on either side of the overcenter position will move it towards this position where it will move overcenter due to its momentum, with the cable remaining in cooperating engagement with the pulley apparatus, and then moves away from the center position due to gravity as the cable is extended.

PATENTED JUN 15 1971
3,584,732
SHEET 1 OF 2
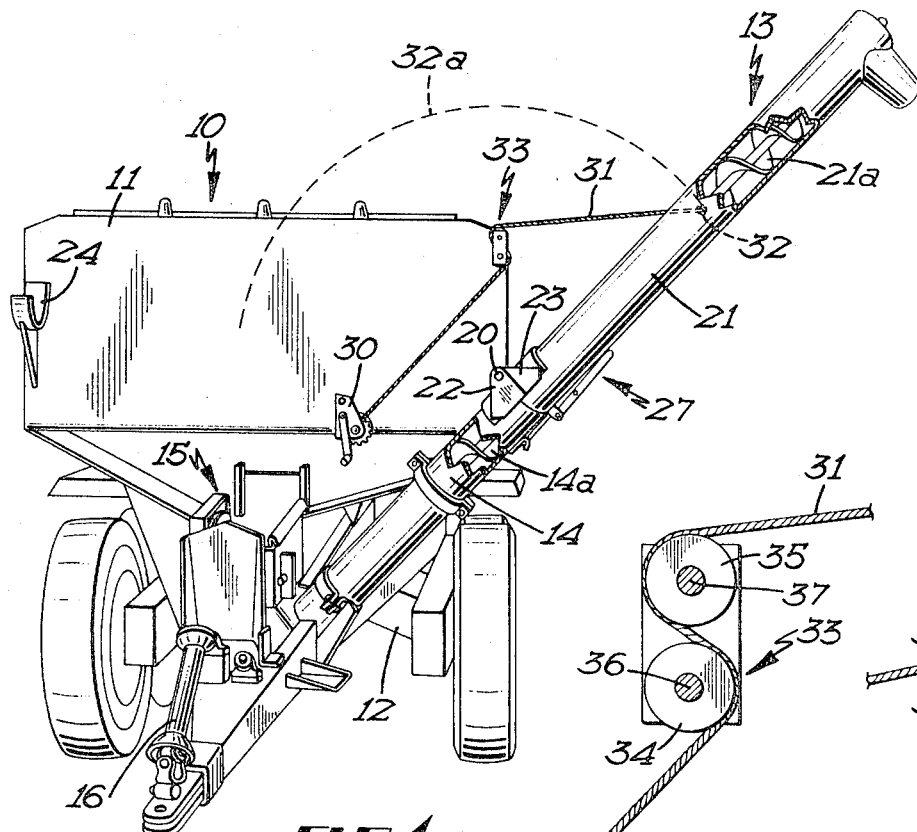
FIG 1
FIG 1A
FIG 2A
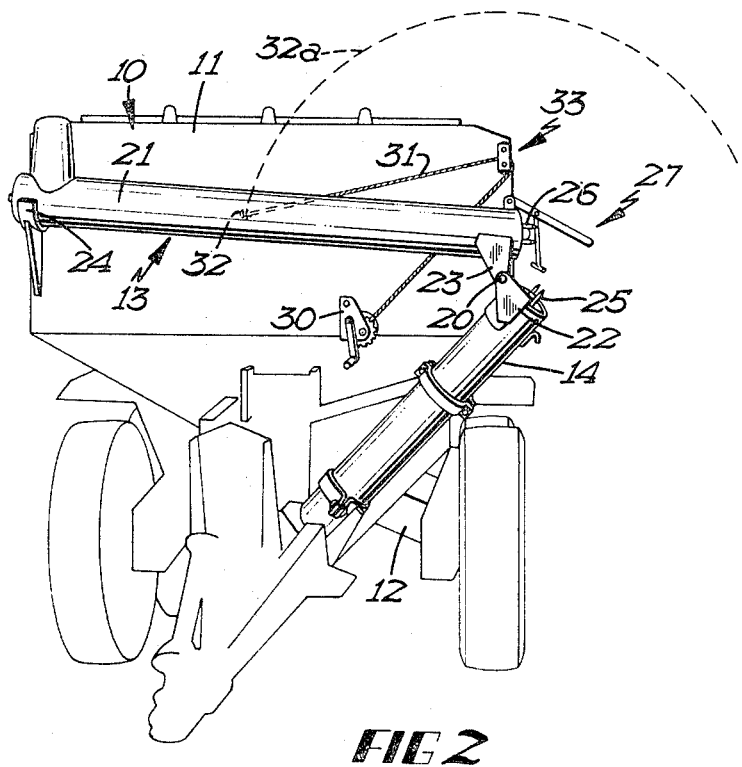
FIG 2
INVENTORS
LOREN E. TYLER,
JAMES L. RICHARDSON
BY Donald R Sjostrom
ATTORNEY

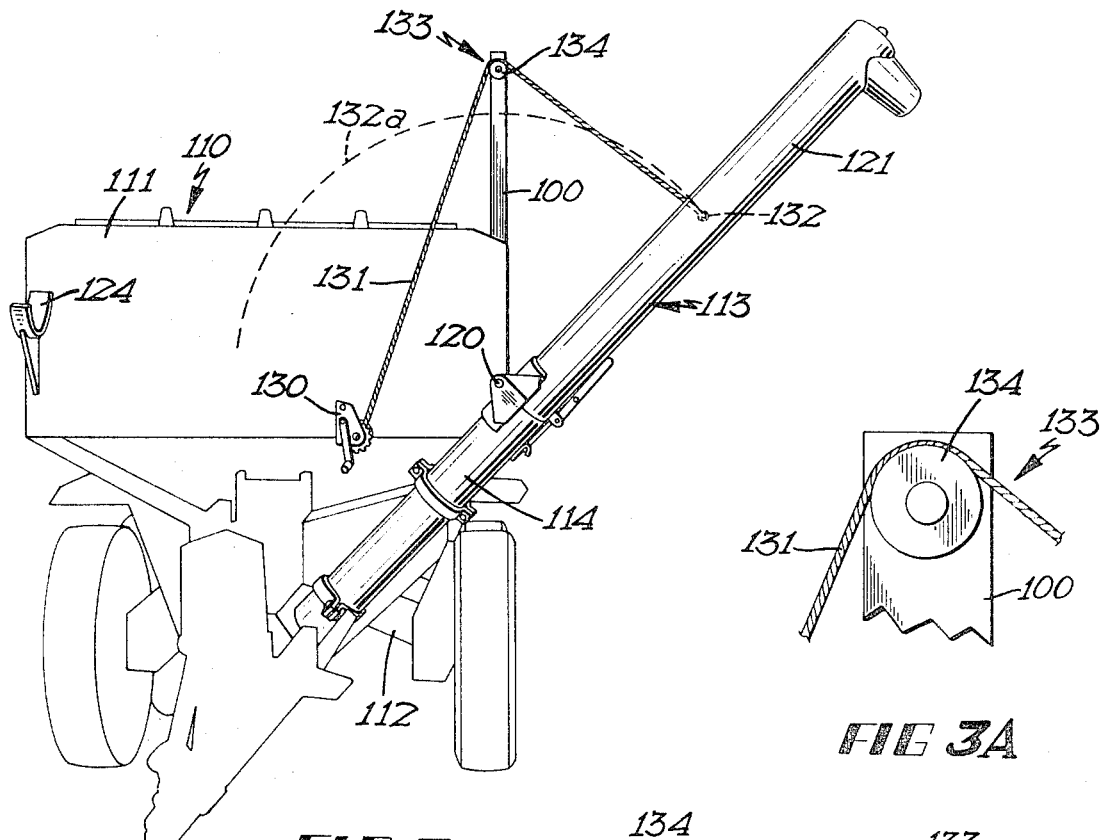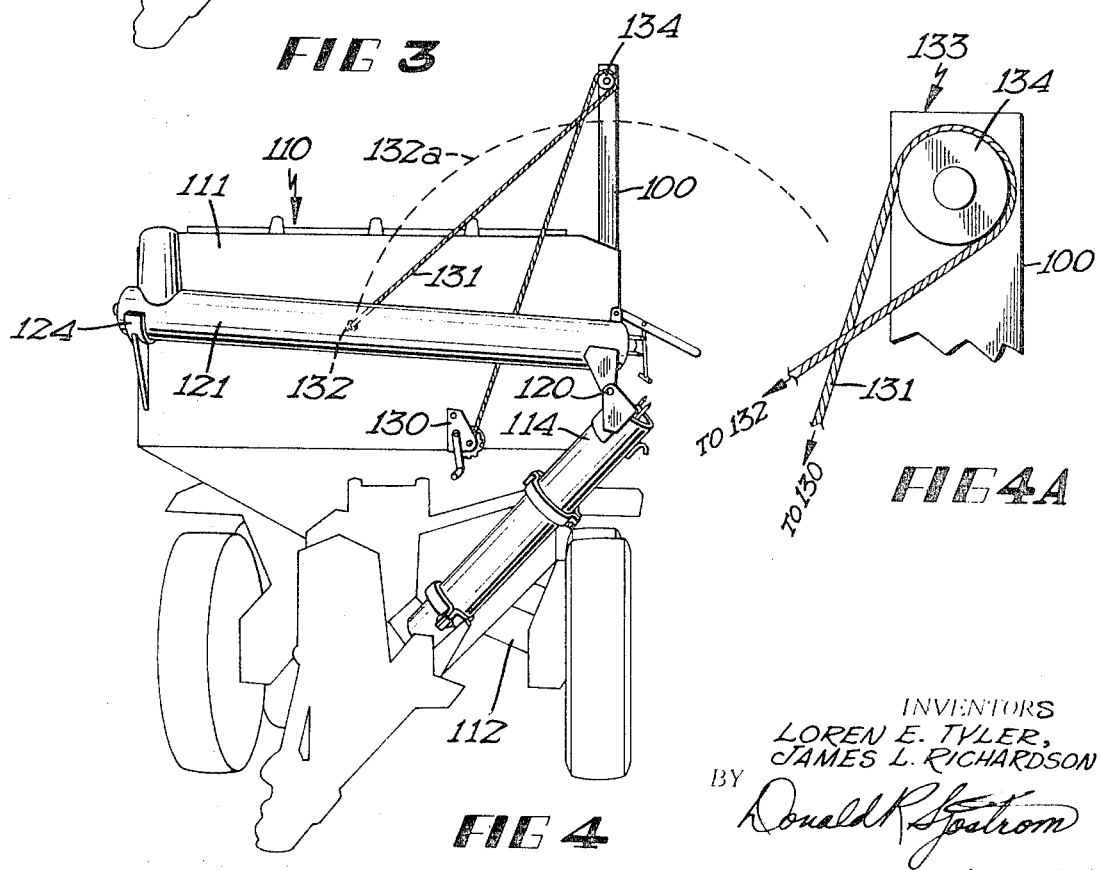

3,584,732

OVER-CENTER WINCH APPARATUS

BACKGROUND OF THE INVENTION

This invention relates to over-center winch apparatus and particularly to an apparatus of this type for use in connection with a conveyor which is articulated at or near its center so that it may be retracted when it is not in use but may be extended when it is to be used. Such an apparatus finds particular application in connection with trailer or truck-type tanks for hauling agricultural materials such as fertilizer or feed. Articulated conveyors of various types have been utilized in this type of application in the past. Generally these conveyors are relatively large and heavy and even the pivot point may be a substantial distance above the ground. Therefore, one of the major problems has been in handling the pivotal or movable part of the conveyor without the danger of injury to personnel or to the equipment itself. There has been a distinct need for a simple apparatus which will render such a conveyor safely and relatively easily movable from one of its positions to the other by a single person.

BRIEF SUMMARY OF INVENTION

This invention provides an improvement in over-center apparatus and particularly is applicable to an articulated conveyor of the type described above. The invention provides a simple and inexpensive apparatus which renders the conveyor safely and easily moved from one of its positions to the other by a single individual operating a simple winch. The apparatus does not interfere with the ordinary operation of the conveyor or the equipment to which it is attached nor does it add any substantial bulk or weight to the equipment.

Specifically, the over-center apparatus includes a support means such as the frame of the hauler-spreader illustrated, an elongated movable member, such as the movable portion of the conveyor, means pivotally mounting the movable member on the support means whereby the movable member is movable through an arc including positions on opposite sides of a vertical or over-center position. An idler means is mounted on the support means, spaced from and in substantially vertical alignment with the vertical position of the movable member. A flexible cable or the like is connected to the movable member and extends to the idler means and has a portion extending therebeyond which may be connected to a winch or the like. The cable and the idler means cooperate in such manner that application of a tension force to the cable when the movable member is on either side of the vertical position moves it towards this vertical position where its own momentum carries it over-center the cable remaining in cooperating engagement with the idler means as the member passes over center. Release or extension of the cable means renders the movable member movable by gravity away from the vertical position.

In one preferred arrangement, the idler means includes a single pulley which is mounted vertically above the pivot point of the movable member and spaced therefrom so that it is outside of the arc traversed by the point of connection between the cable and the movable member as the movable member moves through its over-center position. In this arrangement the cable extends over the top of the single pulley. Another arrangement uses a pair of relatively closely spaced pulleys, each with its axis of rotation generally parallel to the pivot axis of the movable member and in vertical alignment therewith.

In the preferred arrangement, this over-center apparatus is used in connection with a conveyor apparatus which has a lower fixed portion and an upper portion movable with respect thereto. The over-center apparatus operates to move the movable portion between an extended position in alignment with the fixed portion and a retracted or rest position wherein it extends back in the direction of the fixed portion.

An object of this invention is to provide an over-center apparatus including a pulley or idler and cable arrangement wherein application of a tension force to the cable when the movable member connected thereto is on either side of its over-center position will move it towards this position where it will move overcenter by its own momentum, and then will move away over-center the center position by the force of gravity as the cable means is extended.

Another object of the invention is to provide an over-center apparatus wherein the cable remains in cooperating engagement with the idler or pulley means as the movable member connected to the cable means passes over-center.

Another object of the invention is to provide an over-center apparatus as described above wherein the apparatus provides a good mechanical advantage when the movable member is being moved towards the over-center position from either side thereof.

Still another object of the invention is to provide an over-center apparatus as described above which is particularly adaptable for use with an articulated conveyor having a portion movable between an extended and a retracted position on opposite sides of an over-center or vertical position.

Still another object of the invention is to provide an over-center apparatus whereby the movable portion of an articulated conveyor as described above may be safely and relatively easily moved from one position to the other by a single person without endangering the person moving it or damaging the apparatus.

These and other objects of this invention will become apparent upon reading the following detailed description of the invention.

BRIEF DESCRIPTION OF DRAWING

FIG. 1 is a front view of a hauler-spreader for fertilizer or the like which utilizes the present invention in connection with an articulated auger conveyor mounted thereon. FIG. 1 discloses the conveyor in an extended position.

FIG. 1a is an enlarged fragmentary view disclosing an idler means and cooperating cable which is a part of the apparatus of FIG. 1.

FIG. 2 is a somewhat schematic view showing the apparatus of FIG. 1 with the movable portion of the auger conveyor in a retracted position.

FIG. 2A is an enlarged fragmentary view disclosing the idler means and cable as it appears in FIG. 2.

FIG. 3 is generally similar to FIG. 1, disclosing the apparatus with the conveyor in extended position, but discloses another form of the invention.

FIG. 3A is an enlarged fragmentary view disclosing an idler and cooperating cable which is a part of the apparatus of FIG. 3.

FIG. 4 discloses the apparatus of FIG. 4 with the auger conveyor in its retracted position.

FIG. 4A is an enlarged fragmentary view disclosing the idler means and cooperating cable as it appears in FIG. 4.

DETAILED DESCRIPTION

Referring to FIG. 1 of the drawing, reference numeral 10 refers generally to an agricultural bulk material hauler having a tank or hopper 11 mounted on a frame 12 which is provided with a plurality of wheels and which is adapted to be connected to a truck or tractor for towing. It should be noted that the hopper may also be mounted directly on a truck. The hauler per se will not be described in detail since the details thereof are not critical to the present invention. Tank 11 provides a large container for particulate material such as fertilizer or feed and may have a capacity as large as 8 or 10 tons. Running longitudinally at the bottom of the hopper is a conveyor such as an endless chain for conveying the particular material to one end or the other of the hopper. In the unit disclosed, the forward end of the hopper is provided with an auger conveyor 13 which has a lower portion 14 fixed on frame 12 and thus fixed with respect to hopper 11 also. Portion 14 is disposed at an acute angle with the horizontal and has its lower end extending to substantially the center of the hopper and spaced somewhat below the hopper. The remote end of member 14 extends to a position approximately at the right-hand side (as seen in FIG. 1) of the hopper. At the lower end of member 14 there is provided appropriate guide means 15 for guiding the material from the lower portion of hopper 11 and into the end of member 14. Power for driving the auger of conveyor 13, and also for operating the conveyor described above which extends at the bottom of hopper 11, is applied through an appropriate power takeoff shaft 16 which may be driven by the tractor or truck. The details of the power transmitting apparatus and of the guide means between the hopper and conveyor have not been disclosed since the details thereof are not critical to this invention.

It will be appreciated that hauler 10 may be a combination spreader-hauler for fertilizer or the like and that it will then have at its rear end, appropriate spreading apparatus such as distributor discs and an arrangement whereby the conveyor at the bottom of the hopper may be operated to move material to the rear of the hopper and thus supply it to the distributing apparatus.

Pivotally connected as by an appropriate pivot pin 20 at the remote end of portion 14 of the auger conveyor is a movable portion 21 of the conveyor. Adjacent its remote end portion 14 has a pair of substantially parallel ear or tab members 22 extending from and generally tangential to the auger tube at opposite sides thereof. Cooperating with tabs 22 are a pair of similar tabs 23 extending from the inner end of the auger tube of portion 21. It is through these tabs that pivot pin 20 extends, providing a pivot axis for the movable portion 21 of the auger conveyor. Thus, the hopper and frame of hauler 10, through fixed portion 14, provide a support means for portion 21 of the conveyor. As can best be seen by reference to both FIGS. 1 and 2, movable portion 21 can be moved between two positions on opposite sides of an over-center or vertical position. In FIG. 1, portion 21 is shown in its extended position where it is in continuous alignment with fixed portion 14 so that together they form an elongated auger conveyor extending above and to one side of the hopper. In FIG. 2, portion 21 is in its retracted or rest position where it extends almost horizontally across the hopper with the remote end cradled in an appropriate cradle or rest 24. It will be appreciated that the auger is also formed in two portions with one portion 14a disposed in fixed conveyor portion 14 and another portion 21a disposed in movable portion 21 of the conveyor. The mating ends of these two portions of the auger are provided with appropriate means such as extending fingers 25 and 26 on portions 14a and 21a, respectively, which provide an operative driving connection when the movable portion of the conveyor is in its extended position. Appropriate means such as a toggle latch 27 is provided to lock or fix the two portions together when movable portion 21 is in its extended position.

It will be appreciated that it would be extremely difficult to move portion 21 from one position to the other without some kind of mechanical apparatus to assist. The member is relatively heavy and in a typical embodiment, pivot 20 is disposed about 5 feet above the ground. Movement of member 21 from one position to the other by hand, at least if done by a single person, would be dangerous to both the individual and to the equipment itself because of the likelihood that he would not be able to control it as it passes over-center. In the past this has posed a difficult problem which is not easily solved because any type of mechanical apparatus to assist in maneuvering the movable portion from one position to the other should provide some type of mechanical advantage and also must be such that the apparatus will retain control as portion 21 moves over-center.

FIGS. 1 and 2 illustrate how the apparatus of this invention overcomes this difficulty. A simple handcrank winch 30 is mounted on the end of hopper 11. A cable or the like 31 has one end connected to movable portion 21 by appropriate means at a point of connection 32 located on the back side of the auger tube and directly behind the axis of rotation of the auger (as seen in FIGS. 1 and 2). Thus, point 32 is disposed as close as possible to the plane of the front end of hopper 11. The other end of cable 31 is connected to winch 30 whereby it may be retracted or extended by operation of the crank. Intermediate these two ends of cable 31 there is disposed an idler or pulley means 33 mounted on the forward end of hopper 11 and spaced from and in vertical alignment with pivot 20. Idler means 33 includes a pair of relatively closely spaced pulleys 34 and 35 disposed substantially in a single plane parallel to the front of hopper 11, and rotatable about generally horizontal axes 36 and 37, respectively, which are substantially parallel to and in vertical alignment with the pivot axis provided by pivot pin 20. It will be appreciated that as member 21 is pivoted about pin 20, the point of connection 32 between cable means 31 and member 21 will traverse an arc 32a in a substantially vertical plane which will thus be referred to as "a substantially vertical arc." Idler means 33 is disposed inside of this arc as well as in vertical alignment with pin 20. In the preferred form, winch 30 is also located within this arc. The winch should at least be disposed below the vertical position of idler means 33.

FIG. 1a discloses the relationship between cable 31 and pulleys 34 and 35 when conveyor portion 21 is in the extended position disclosed in FIG. 1. Here cable 31 extends from winch 30 and from the underside of idler means 33, around the left side of pulley 34, between pulleys 34 and 35 and then around the left side and across the top of pulley 35 and then extends to the right and slightly upward to point 32 where it is attached to movable portion 21. It will be appreciated that idler means 33 provides a mechanical advantage over a direct connection of cable 31 to the winch because of the greater component of force in a direction along arc 32a. When a tension force is applied to cable 31 portion 21 will be moved toward the vertical or over-center position. As it approaches this position, its own momentum will carry it through the over-center position so that it will extend slightly to the left of the vertical. As this occurs, cable 31 will be lifted from pulley 35, providing a small amount of slack in the cable and allowing member 31 to move over-center The cable will now have the relationship disclosed in FIG. 2A with respect to pulleys 34 and 35. If cable 31 is now extended by backing off winch 30, movable portion 21 will be moved towards its rest position by gravity but it will be easily controlled because of the winch. It will be noted that as movable portion 21 moves closer to its rest position, and thus has a greater component of gravitation force tending to move it, the mechanical advantage provided by the winch apparatus increases because the vertical component of force asserted on member 21 by cable 31 increases.

Retraction of cable 31 by operation of winch 30 will move member 21 back toward the vertical or over-center position. As it approaches this position, winch 30 may be backed off slightly to provide a small amount of slack in cable 31, allowing the momentum of member 21 to carry it over-center. Thereafter, gravity will move it towards its extended position as cable 31 is extended by backing off winch 30.

It will be appreciated that "cable" 31 may be chain, rope, metal or nonmetal cable or other flexible material and "idler means" 33 and "pulleys" and 35 may be cooperating pulleys, sprockets, fixed guide members or the like. Therefore the terms "cable means," "idler means," and "pulleys" shall be construed to include these various equivalents.

FIGS. 3 and 4 disclose another embodiment of the invention including a bulk hauler apparatus 110 substantially identical to hauler 10 of FIGS. 1 and 2. Corresponding components have been given reference numerals similar to those utilized in FIGS. 1 and 2 except that they are preceded by the numeral 1. Thus, bulk hauler 110 has a hopper 111 carried by a frame 112. The auger conveyor 113 includes a fixed portion 114 and a movable portion 121. These two portions are connected by a pivot pin 120 which provides a horizontal pivot about which portion 121 is rotatable.

The structure of bulk hauler 110 differs from that of the apparatus disclosed in FIGS. 1 and 2 in that here the idler means 133 comprises a single pulley 134 which is carried by a mast 100 which is disposed a substantial distance above the top of hopper 111 and in vertical alignment with pivot pin 120. Cable 131 extends from winch 130 upward and over pulley 134 and then downward to a point of connection 132 where it is connected to movable portion 121 of the auger conveyor. In this embodiment it is essential that idler means 133 be disposed outside of the arc 132a traversed by connection point 132 as member 121 moves through its over-center position. It will be appreciated that this is essential if cable 131 is to remain in cooperating engagement with pulley 134 as conveyor portion 121 moves over-center. It will be appreciated that this may be accomplished by lowering connection point 132 on member 121 and mounting the idler means directly on hopper 111.

FIG. 3A discloses the relationship between cable 131 and pulley 134 when portion 121 is in the extended position disclosed in FIG. 3. Operation of winch 130 to apply tension force to cable 131 will pull member 121 about pivot 120 and towards its vertical or over-center position. The position of pulley 134 will cause a rather large component of the force applied by cable 131 to be applied to member 121 in a vertical direction and thus will give a mechanical advantage. As member 121 approaches its vertical position, winch 130 can be backed off slightly allowing a small amount of slack in cable 131, allowing member 121 to pass through its over-center position due to its own momentum. As soon as it has passed through the over-center position, it will tend to move towards pad or rest 124 due to the force of gravity. As portion 121 passes through the over-center position, the end of cable 131 which is attached to portion 121 will pass beneath pulley 134 and as member 121 moves towards pad 124, this end of the cable will eventually cross over that portion of the cable which extends down to the winch. This relationship is disclosed in FIG. 4A. Thus, the movement of member 121 towards its rest position by gravity is maintained under control of the winch and again, as the movable portion of the conveyor moves further towards pad 124 and thus closer to the horizontal, the vertical component of the force applied at point 132 by cable 131 increases so that the movement of member 121 can be relatively easily controlled. Retraction of cable 131 by operation of winch 130 will move member 121 back toward the over-center position when it is to be extended.

In either of the embodiments described, it will be noted that application of a tension force to cable 131 when the movable portion of the conveyor is on either side of its over-center position will move it towards that over-center position. As it approaches this position, its own momentum will carry it through the over-center position and then gravity will move it away from the over-center position. In both arrangements, the cable remains in cooperating relationship with the idler means as the movable member passes over-center and thus its movement is maintained under control of the winch both toward and away from this over-center position. It can therefore be manipulated safely and easily by one person operating the winch.

It will be realized that while this invention finds particular application in connection with agricultural equipment such as the bulk hauler and auger conveyor described herein, it may also find ready application in various other areas where a pivoted overcentered member must be manipulated. Therefore it is deemed that various modifications of this invention may become apparent to those skilled in the art without departing from the scope of this invention.

The embodiments of the invention in which I claim an exclusive property or right are defined as follows:

1. Over-center apparatus comprising: support means; an elongated movable member; means pivotally mounting said movable member on said support means whereby said member is movable through a substantially vertical arc including positions on opposite sides of a vertical position; idler means mounted on said support means substantially in alignment with the vertical position of said member; flexible cable means connected to said member and extending to said idler means and having a portion extending beyond said idler means; and said cable means continuously extending around at least a part of said idler means and thereby continuously being in cooperating engagement with said idler means whereby application of a tension force to said cable means when said movable member is on either side of said vertical position moves said member toward the idler means and toward said vertical position where its momentum carries it over-center said cable remains in cooperating engagement with said idler means when said member passes over-center, and release of said cable means renders said member movable by gravity away from said vertical position.

2. The apparatus of claim 1 wherein: said idler means comprises a single roller means disposed outside of the arc traversed by the point of connection between the cable means and the movable member as said movable member moves through its vertical position; and said cable means passes over said roller and extends downwardly on each side thereof.

3. The apparatus of claim 1 wherein: said idler means comprises a pair of relatively closely spaced rollers each disposed in substantially the same plane and inside of the arc traversed by the point of connection between the cable means and the movable member; and said cable means extends between said pair of rollers.

4. The apparatus of claim 3 wherein: each of said rollers has an axis of rotation substantially in vertical alignment with the vertical position of the movable member and substantially parallel to the axis about which said member pivots.

5. The apparatus of claim 1 further including winch means fixed with respect to said support means and disposed below said idler means, said winch means being operably connected to the extending portion of said cable means and operable to selectively extend or retract said cable means.

6. Over-center apparatus comprising: support means including a fixed portion of a material conveying means disposed at an acute angle with the horizontal; a movable portion of said material conveying means; means pivotally connecting said movable portion to said fixed portion for movement from an extended position in alignment with said fixed portion, through a vertical over-center position, to a retracted position wherein said movable portion forms an angle of less than 180°- with said fixed portion; idler means mounted on said support means substantially in alignment with the vertical position of said movable portion; flexible cable means connected to said movable portion and extending to said idler means and having a portion extending beyond said idler means; and said cable means being in cooperating engagement with said idler means whereby application of a tension force to said cable means when said movable portion is on either side of said vertical position moves said movable portion toward said vertical position where its momentum carries it over-center, said cable remains in cooperating engagement with said idler means when said movable portion passes over-center, and release of said cable means renders said movable portion movable by gravity away from said vertical position.

7. Material conveying means comprising: support means; a fixed material conveying portion mounted on said support means and having a remote end; a movable material conveying portion having first and second ends; means mounting said movable portion for pivotal movement about the remote end of said fixed portion between a plurality of positions on opposite sides of a vertical over-center position; idler means mounted on said support means in spaced, substantially vertical alignment with the pivot for said movable portion; winch means; flexible cable means having one end attached to said movable portion and a second end operably connected to said winch means whereby said winch means is operable to extend or retract said cable means; and a portion of said cable means intermediate said two ends cooperatively engaging said idler means whereby retraction of said cable means when said movable portion is on either side of said vertical position moves said member toward said vertical position, said cable means continues in cooperative engagement with said idler means when said movable portion moves over-center, and extension of said cable means renders said movable portion movable away from said center position by gravity.

8. The apparatus of claim 7 wherein: said support means includes hopper means for containing a quantity of particulate material; said fixed conveying portion is mounted adjacent said hopper means at an acute angle with the horizontal, has a lower end adapted to receive material from said hopper and said remote end thereof extends substantially to one side of said hopper means; said movable portion is pivotable between an extended position on one side of the over-center position and a retracted position on the other side thereof; and said movable portion is disposed in substantially continuous alignment with said fixed portion and extends beyond said hopper means when in its extended position; and said movable portion extends back substantially across said hopper means when in its retracted position.

9. The apparatus of claim 7 wherein: said support means comprises a bulk hauler apparatus including a hopper means for containing particulate material; and said conveying means comprises an auger conveyor with a first portion fixed with respect to said hopper at an angle above the horizontal and adapted to receive material therefrom, and a movable portion for receiving material from said fixed portion.

10. The apparatus of claim 9 wherein: said idler means comprises a single roller means mounted on said hopper means and disposed outside of the arc traversed by the point of connection between the cable means and the movable portion of said conveyor means as said movable portion moves through its vertical position; and said cable means passes over said roller and extends downwardly on each side thereof.

11. The apparatus of claim 9 wherein: said idler means comprises a pair of relatively closely spaced rollers mounted on said hopper means and each disposed in substantially the same plane and inside of the arc traversed by the point of connection between the cable means and the movable portion of said conveyor means; and said cable means extends between said pair of rollers.

12. The apparatus of claim 11 wherein each of said rollers has an axis of rotation substantially in vertical alignment with the vertical position of the movable portion of said conveyor means and substantially parallel to the axis about which said movable portion pivots.

13. Over-center apparatus for a material conveying means comprising: support means; a fixed material conveying portion mounted on said support means and having a remote end; a movable material conveying portion; means pivotally mounting said movable portion for pivotal movement about the remote end of said fixed portion between a plurality of positions on opposite sides of a vertical over-center position, said plurality of positions including a retracted position on one side of said over-center position and an extended position, in substantial alignment with said fixed portion, on the other side of said over-center position; means mounted on said support means and providing a fixed pivot means substantially in alignment with the over-center position of said movable portion and spaced from the pivotal mounting thereof, and means connected to said movable portion and extending to said fixed pivot means, the last named means being extendable and retractable from said fixed pivot means and being movable in an arc about said fixed pivot means, said last named means being operable to apply a force to said movable portion when it is on either side of said over-center position to move said movable portion toward said over-center position where its momentum carries it over-center and is further operable to control movement of said movable portion in either direction away from said over-center position.

14. The apparatus of claim 13 wherein: said fixed pivot means includes an idler means spaced above the pivot of said movable means; and said means connected to said movable means includes a flexible cable extending over said idler means and connected to said movable means at a position thereon spaced from the pivot of said movable means.